(12) United States Patent
Lilley et al.

(10) Patent No.: US 9,987,949 B2
(45) Date of Patent: Jun. 5, 2018

(54) SEATING STRUCTURE INCLUDING A PRESENCE SENSOR

(71) Applicant: Herman Miller, Inc., Zeeland, MI (US)

(72) Inventors: Matthew James Lilley, Grand Rapids, MI (US); Adam James Daley-Fell, Grand Rapids, MI (US)

(73) Assignee: HERMAN MILLER, INC., Zeeland, MI (US)

( * ) Notice: Subject to any disclaimer, the term of this patent is extended or adjusted under 35 U.S.C. 154(b) by 0 days. days.

(21) Appl. No.: 15/676,199

(22) Filed: Aug. 14, 2017

(65) Prior Publication Data

US 2018/0043794 A1  Feb. 15, 2018

Related U.S. Application Data

(60) Provisional application No. 62/374,155, filed on Aug. 12, 2016.

(51) Int. Cl.
*G08B 21/00* (2006.01)
*B60N 2/00* (2006.01)
(Continued)

(52) U.S. Cl.
CPC .............. *B60N 2/002* (2013.01); *A47C 7/282* (2013.01); *A47C 31/00* (2013.01); *B60R 21/01512* (2014.10)

(58) Field of Classification Search
CPC ......... B60N 2/002; A47C 7/282; A47C 31/00; B60R 21/01512
See application file for complete search history.

(56) References Cited

U.S. PATENT DOCUMENTS 4,630,867 A    12/1986  Gulliver
H000536 H *  10/1988  Strickland ..................... 324/456
(Continued)

FOREIGN PATENT DOCUMENTS

EP    1335639 A2    8/2003
GB    2463076 A     3/2010
(Continued)

OTHER PUBLICATIONS

International Search Report and Written Opinion for Application No. PCT/US2017/046719 dated Nov. 23, 2017 (19 pages).

*Primary Examiner* — Joseph Feild
*Assistant Examiner* — Rufus Point
(74) *Attorney, Agent, or Firm* — Michael Best & Friedrich LLP

(57) ABSTRACT

A seating structure includes a base, a seat, a backrest connected to the seat, and an electronic circuit supported by the base. The seat or the backrest includes a carrier and a suspension material secured to the carrier and spanning across an opening formed by the carrier. The suspension material includes a plurality of electrostatic discharge fibers. The electronic circuit is coupled to the electrostatic discharge fibers. The electronic circuit includes an electronic processor and a sensor. The sensor is configured to generate an output signal indicative of an electrical parameter of one of the electrostatic discharge fibers. The electronic processor is configured to apply a drive signal to one of the plurality of electrostatic discharge fibers, receive the output signal from the sensor, and determine a state of the seating structure based on the output signal from the sensor.

20 Claims, 15 Drawing Sheets

(51) Int. Cl.
  *A47C 7/28* (2006.01)
  *A47C 31/00* (2006.01)
  *B60R 21/015* (2006.01)

(56) References Cited

U.S. PATENT DOCUMENTS

| | | | |
|---|---|---|---|
| 6,224,099 B1* | 5/2001 | Nielson | C06B 21/0075 |
| | | | 280/741 |
| 6,964,370 B1 | 11/2005 | Hagale et al. | |
| 7,162,111 B2* | 1/2007 | Baur | B60N 2/002 |
| | | | 385/12 |
| 7,380,881 B2 | 6/2008 | Freed et al. | |
| 7,598,881 B2 | 10/2009 | Morgan | |
| 8,154,394 B2* | 4/2012 | Hansen | B60N 2/5685 |
| | | | 340/3.1 |
| 8,509,320 B2 | 8/2013 | Uno et al. | |
| 8,698,511 B2* | 4/2014 | Wendt | B60R 21/01532 |
| | | | 324/658 |
| 2002/0167486 A1 | 11/2002 | Tan et al. | |
| 2003/0013797 A1* | 1/2003 | Thielen | C08K 3/04 |
| | | | 524/495 |
| 2003/0151240 A1 | 8/2003 | Saitou et al. | |
| 2003/0233034 A1 | 12/2003 | Varri et al. | |
| 2006/0192417 A1* | 8/2006 | Ellinger | B60R 21/01516 |
| | | | 297/217.3 |
| 2009/0001787 A1* | 1/2009 | Lawall | B60N 2/5628 |
| | | | 297/217.1 |
| 2009/0302648 A1* | 12/2009 | Kato | B60N 2/002 |
| | | | 297/217.2 |
| 2010/0078194 A1* | 4/2010 | Bhatt | B82Y 30/00 |
| | | | 174/110 SR |
| 2010/0102833 A1 | 4/2010 | Uno et al. | |
| 2010/0301880 A1* | 12/2010 | Stanley | B60R 21/01532 |
| | | | 324/686 |
| 2011/0267735 A1 | 11/2011 | Kow | |
| 2015/0144514 A1* | 5/2015 | Brennan | A61B 19/0256 |
| | | | 206/363 |
| 2015/0305961 A1 | 10/2015 | Broerman et al. | |
| 2016/0089059 A1* | 3/2016 | Hu | A61B 5/6892 |
| | | | 600/301 |
| 2016/0206102 A1* | 7/2016 | Aldrich | A47C 3/00 |

FOREIGN PATENT DOCUMENTS

JP  2010233615 A  10/2010
KR  20120031749 A  4/2012

* cited by examiner

SEATING STRUCTURE INCLUDING A PRESENCE SENSOR

CROSS-REFERENCE TO RELATED APPLICATIONS

This application claims the benefit of priority to U.S. application No. 62/374,155, filed Aug. 12, 2016, which is referenced herein in its entirety.

FIELD OF INVENTION

The present invention relates to seating structures.

SUMMARY

In one embodiment, the invention provides a seating structure including a base, a seat supported by the base, a backrest coupled to the seat, and an electronic circuit supported by the base. The seat, the backrest, or both includes a carrier and a suspension material secured to the carrier and spanning across an opening formed by the carrier. The suspension material includes a plurality of electrostatic discharge fibers. The electronic circuit is coupled to at least one of the electrostatic discharge fibers. The electronic circuit includes an electronic processor and a sensor. The sensor is configured to generate an output signal indicative of an electrical parameter of one of the electrostatic discharge fibers. The electronic processor is configured to apply a drive signal to one of the plurality of electrostatic discharge fibers, receive the output signal from the sensor, and determine a state of the seating structure based on the output signal from the sensor.

In another embodiment, the invention provides a method of sensing occupancy of a seat structure having a suspension material. The method includes applying, with an electronic processor supported by the seating structure, a drive signal to at least one of the plurality of electrostatic discharge fibers of the suspension material, and generating, with a sensor supported by the seating structure, an output signal indicative an electrical parameter of one of the plurality of electrostatic discharge fibers. The suspension material spans across a back opening, a seat opening, or both of the seating structure. The method also includes receiving, with the electronic processor, the output signal from the sensor, and determining, with the electronic processor, a state of the seating structure based on the output signal from the sensor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Various exemplary embodiments are related to seating structures and methods of creating seating structures. Seating structures may include any structure used to support a body of a user, for example, without limitation, office chairs, chairs, sofas, airplane seats, vehicle seats, bicycle seats, boat seats, beds, dental and medical seats and beds, auditorium and educational seating, and the like. It should be understood that the various methods and devices disclosed herein may be applied to seating structures other than a seat and/or a backrest, including for example and without limitation armrests, headrests, and other ergonomic positioning features. In addition, the various methods and devices may be applied to structures employing a frame and suspension material other than seating structures. Although the illustrated embodiments are shown in connection with an office chair, other embodiments can include different configurations.

Figure 1:
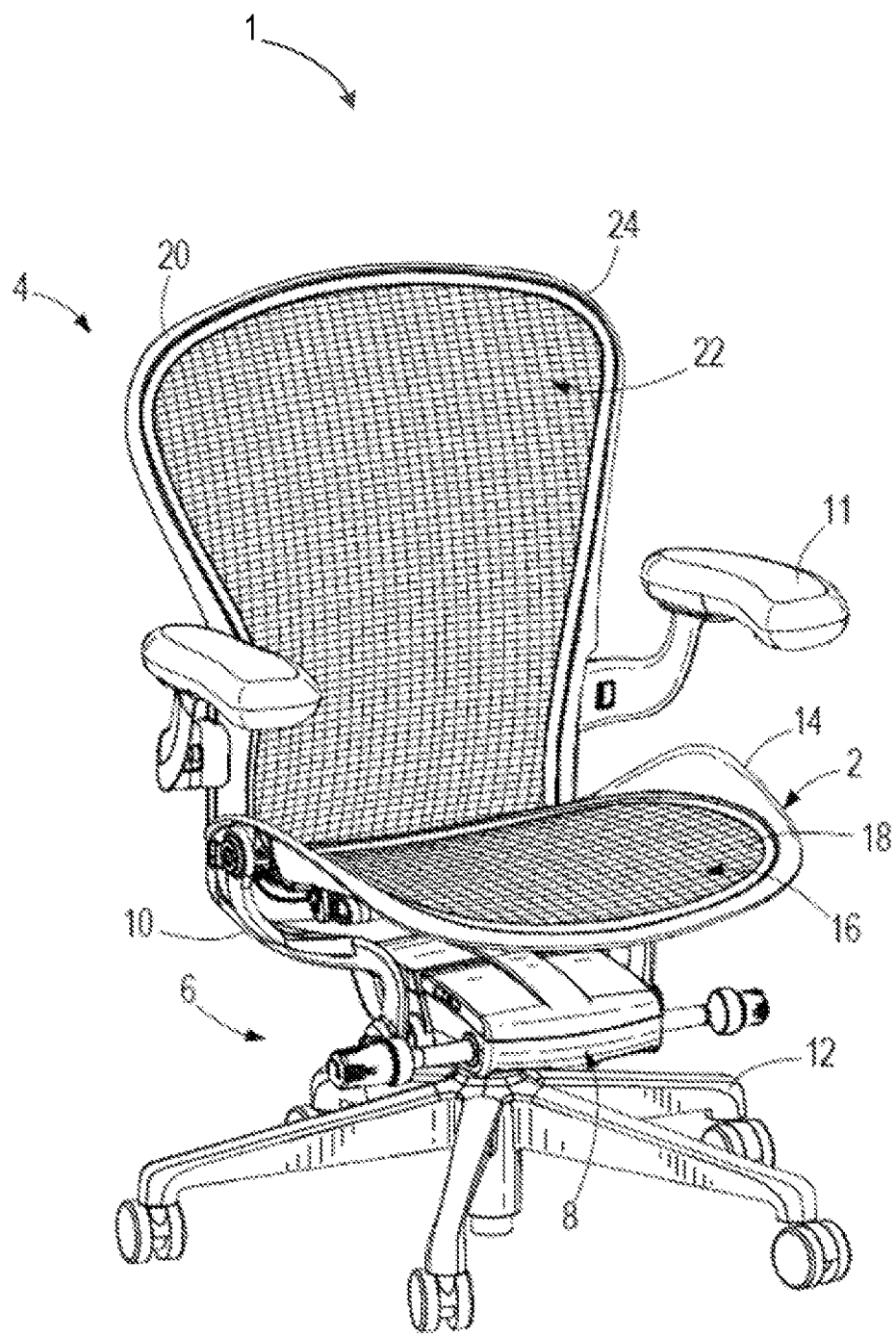
FIG. 1 is a perspective view of an exemplary seating structure.

FIG. 1 shows an exemplary embodiment of a seating structure 1 configured as a chair that includes a seat 2, a backrest 4, and a base 6. The base 6 includes a tilt control housing 8, a support column 10 coupled to and supporting the tilt control housing 8, and a base structure 12 coupled to and supporting the support column 10. A pair of armrests 11 may be connected to the chair.

The seat 2 includes a seat frame 14, a seat suspension material 16, and a seat carrier 18. The seat carrier 18 retains the seat suspension material 16 and connects to the seat frame 14. In the exemplary embodiments shown, the seat frame 14 is formed as a ring having a front, a back, and a pair of sides defining a seat opening. The seat frame 14 may also be formed from side members, a top member, and a bottom member. Different sizes, shapes, and configurations of the seat frame 14 can be used according to aesthetics, ergonomics, space, or other considerations. The seat frame 14 may be integrally formed as a single, homogenous unit, or formed of separate components. When the seat carrier 18 is engaged with the seat frame 14, the seat suspension material 16 spans across the opening of the seat 2.

The backrest 4 includes a back frame 20, a back suspension material 22, and a back carrier 24. The back carrier 24 retains the back suspension material 22 and connects to the back frame 20. In the exemplary embodiments shown, the back frame 20 is formed as a ring having a front, a back, and a pair of sides defining a back opening. The back frame 20 may also be formed from side members, a top member, and a bottom member. Different sizes, shapes, and configurations of the back frame 20 can be used according to aesthetics, ergonomics, space, or other considerations. The back frame 20 may be integrally formed as a single, homogenous unit, or formed of separate components. When the back carrier 24 is engaged with the back frame 20, the back suspension material 22 spans across the opening of the backrest 4.

Figure 2:
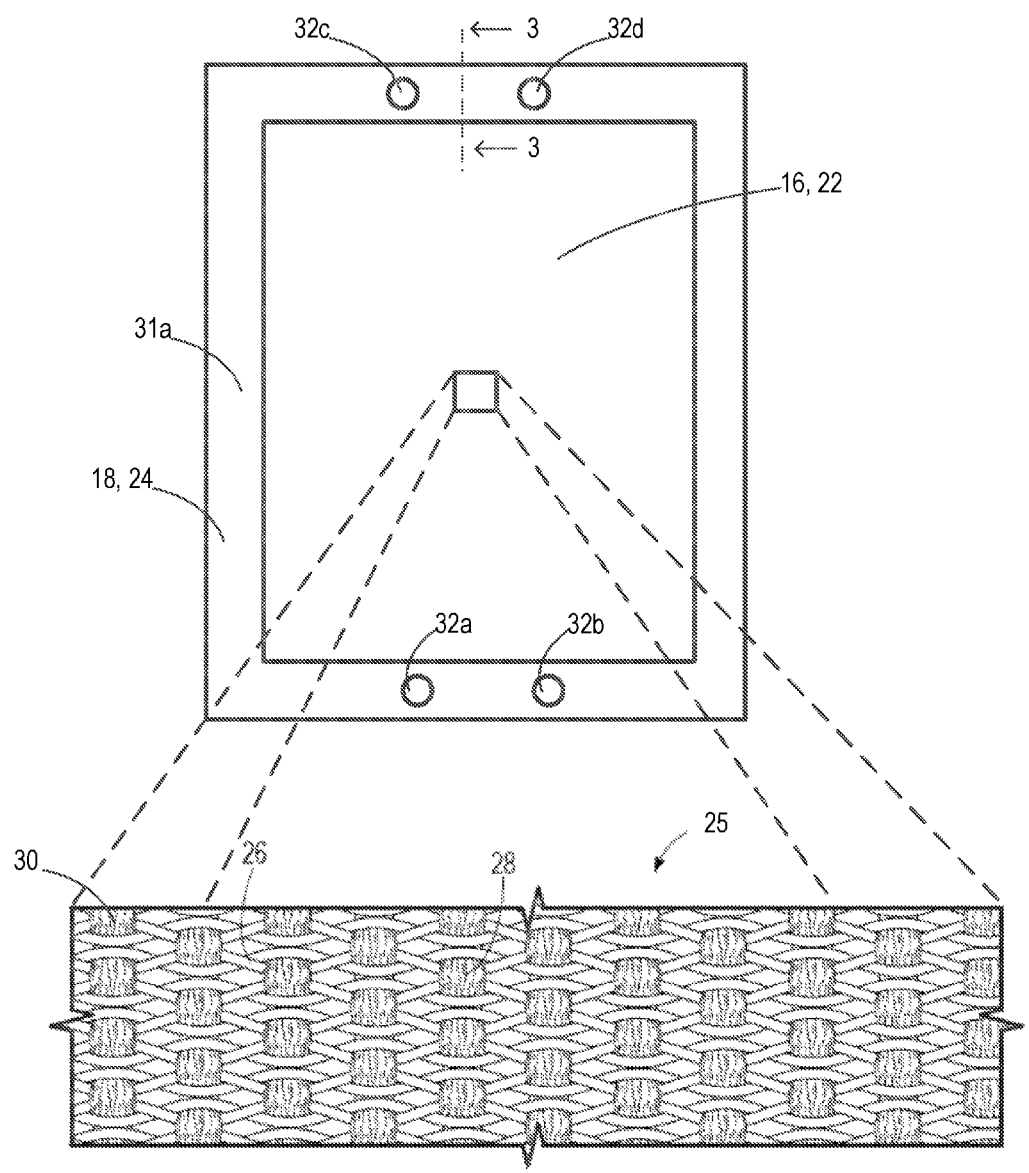
FIG. 2 is a schematic view of a carrier of the seating structure of FIG. 1 including an enlarged view of an exemplary suspension material.

In one embodiment, the suspension materials 16, 22 are made of a woven or knit material, including various elastomeric materials, fabrics, or various molded polymeric materials. The seat 2 and backrest 4 may utilize the same type of material or different materials for the suspension material 16, 22. As shown in portion 25 of FIG. 2 illustrating an enlarged view of the suspension materials 16, 22, the suspension material 16, 22 can include a plurality of monofilaments 26 interlaced with a plurality of multifilament strands 28. The monofilaments 26 can be the primary load carrying members and run laterally in the warp direction of the seat and backrest 4, while the multifilament strands 28 run longitudinal the weft direction. Additionally, monofilaments 26 and/or multifilament 28 may be combined to run in both the lateral and longitudinal directions if necessary.

The suspension materials 16, 22 also include conductive fibers or threads 30. The conductive fibers or threads 30 may conduct static electricity to ground to prevent buildup of static charge. These conductive fibers 30 are also referred to as electrostatic discharge (ESD) fibers. In the illustrated example, at least some of the multifilament strands 28 include conductive fibers 30. In other embodiments, the monofilaments 26 include the conductive fibers 30. In some embodiments, the seat suspension material 16 and the back suspension material 22 include the conductive fibers 30. In other embodiments, however, only the seat suspension material 16 or the back suspension material 22 includes the conductive fibers 30.

Figure 3:
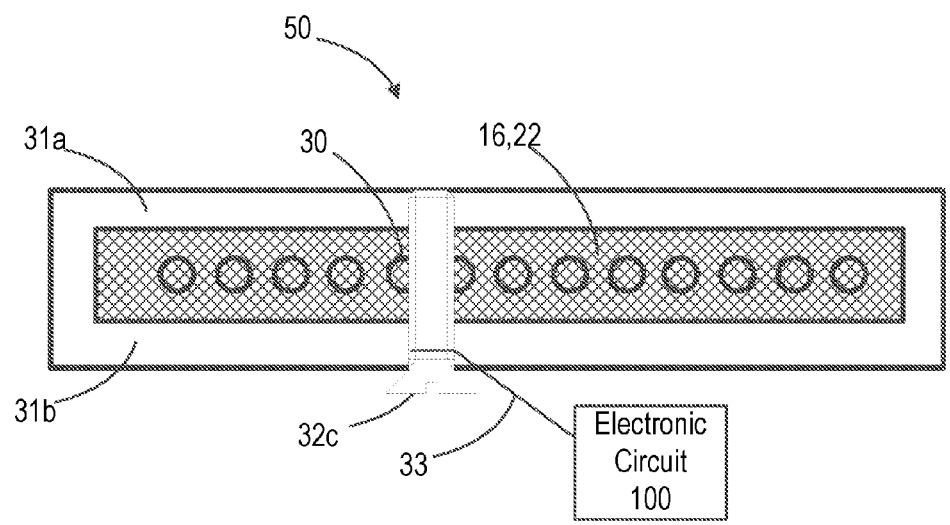
FIG. 3 is a cross-sectional schematic view taken along section line 3-3 of FIG. 2 and illustrates a first embodiment of a connection between the suspension material and an electronic circuit.

The carrier 18, 24 is made from a plastic material, and includes a first portion 31a (e.g., a top portion) and a second portion 31b (e.g., a bottom portion) shown in, for example, FIG. 3. In some embodiments, the first portion 31a and the second portion 31b are made using an overmolding technique to form the contoured edges of the carrier 18, 24. In other embodiments, the first portion 31a and the second portion 31b are made using an insert injection molding technique. As shown schematically in FIG. 2, the first portion 31a and the second portion 31b are joined via fasteners 32a-d. The fasteners 32a-d are made from a metal material. In the illustrated embodiment, the carrier 18, 24 is secured using two front fasteners 32a-b and two back fasteners 32c-d. In other embodiments, however, fewer or more fasteners 32 may be used to secure the first portion of the carrier 18, 24 to the second portion of the carrier 18, 24, and/or to secure the carrier 18, 24 to the frame 14, 20. The fasteners 32a-d may also secure the suspension material 16, 22 to the carrier 18, 24 and to the frame 14, 20.

In some embodiments, the carrier 18, 24 is made from a conductive plastic material such as, for example, electron-conducting polymers (e.g., polyacetylene), proton-conducting polymers, or ion-conducting polymers. The conductive plastic material may have a surface resistivity ranging from approximately $10^0$ to $10^{12}$ Ohm/sq., and, in particular, the surface resistivity may be $10^1$ to $10^6$ Ohm/sq.

As shown in FIGS. 3-7, the conductive fibers 30 are coupled to an electronic circuit 100 (e.g., a sensing circuit) via a connection 50. FIG. 3 illustrates a first embodiment of the connection 50. In the first embodiment, one of the fasteners 32a-d directly connects the conductive fibers 30 to the electronic circuit 100. In the illustrated embodiment, the fasteners 32a-d are screws. As shown in FIG. 3, one of the back fasteners 32c contacts the second portion of the carrier 18, 24 and the conductive fibers 30. A wire or cable 33 is attached (e.g., by wrapping or soldering the wire or cable 33 to the fastener 32c, via a ring and spade terminal, or is otherwise secured) to the fastener 32c and to the electronic circuit 100 to couple the conductive fibers 30 to the electronic circuit 100. Since the fastener 32c is made from a metal material, electrical signals can travel from the electronic circuit 100 to the fastener 32c via the wire 33, and to the conductive fibers 30 through the carrier 18, 24 (e.g., when the carrier 18, 24 is made with conducting plastic).

Figure 4:
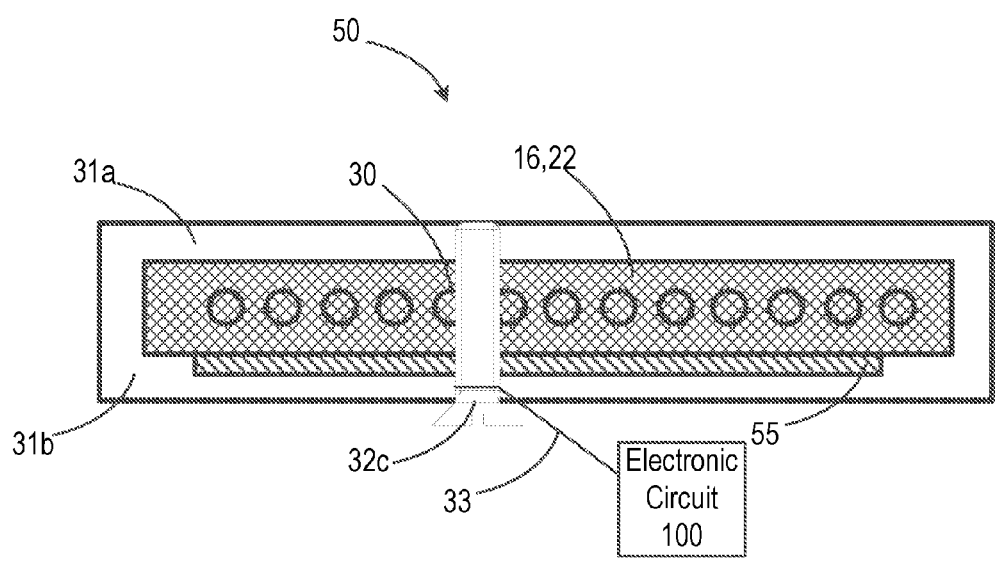
FIG. 4 is a cross-sectional schematic view taken along section line 3-3 of FIG. 2 and illustrates a second embodiment of the connection between the suspension material and the electronic circuit.

In a second embodiment, as shown in FIG. 4, a conductive intermediate 55 is positioned between the carrier 18, 24 and the conductive fibers 30. The conductive intermediate 55 may include, for example, a small metal sheet, a conductive foam piece, conductive plastic, conductive paint spray (or other coating), and the like. The conductive intermediate 55 helps concentrate the electronic signal from the carrier 18, 24 to specific conductive fiber(s). Additionally, the conductive intermediate 55 decreases the electrical losses from the signals between the conductive fibers 30, the fastener 32c, and the carrier 18, 24.

Figure 5:
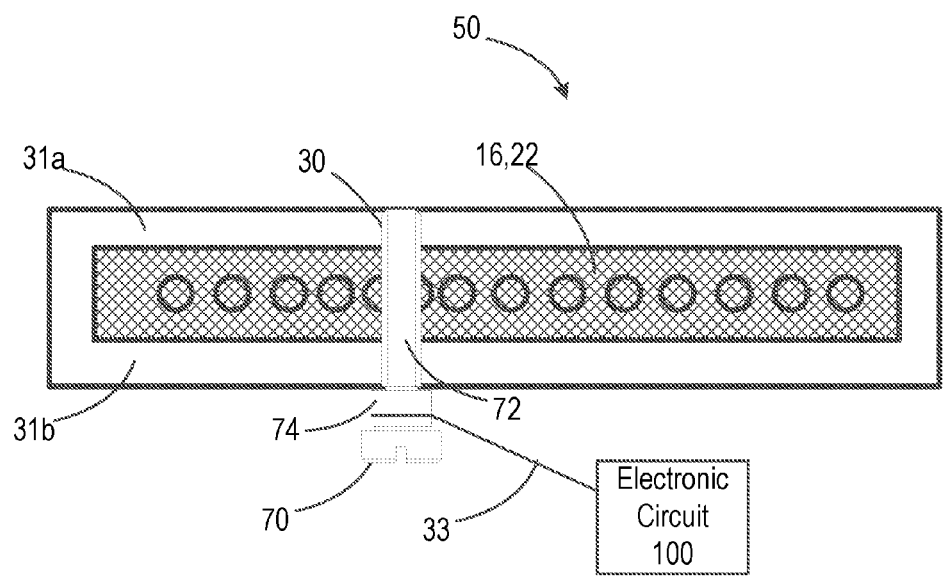
FIG. 5 is a cross-sectional schematic view taken along section line 3-3 of FIG. 2 and illustrates a third embodiment of the connection between the suspension material and the electronic circuit.

In another embodiment, as shown in FIG. 5, the fastener making the connection 50 includes a shoulder screw 70. The shoulder screw 70 includes a threaded portion 72 and a shoulder portion 74. The threaded portion 72 connects the first portion 31a of the carrier 18, 24 to the second portion 31b of the carrier 18, 24 and to the suspension material 16, 22. The shoulder portion 74 is not threaded and receives a connector (e.g., a wire 33, a ring and spade connector, and the like) that connects the fastener 32a to the electronic circuit 100.

Figure 6:
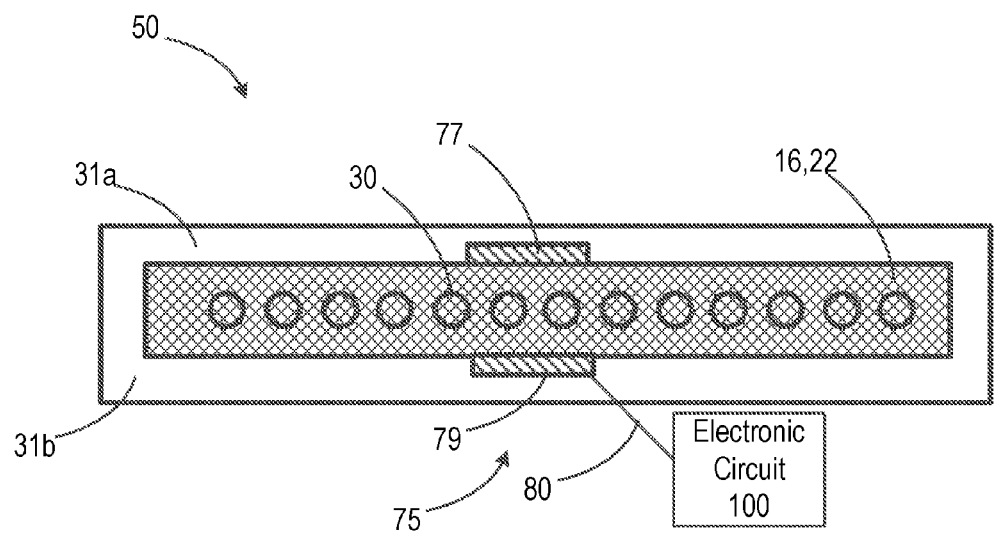
FIG. 6 is a schematic diagram of a fourth embodiment of the connection between the suspension material and the electronic circuit.

FIG. 6 illustrates yet another embodiment of the connection 50. In the illustrated embodiment, the connection 50 includes a pressure connector 75 to connect the conductive fibers 30 to the electronic circuit 100. The pressure connector 75 includes a first connecting plate 77 and a second connecting plate 79. The first connecting plate 77 is attached to the first portion 31a of the seat carrier 18 and the second connecting plate 79 is attached to the second portion 31b of the seat carrier 18, as shown in FIG. 6. The second connecting plate 79 is connected to the electronic circuit 100 via a wire 80 (e.g., similar to wire 33 of FIGS. 3-5). The pressure connector 75 is movable between a first state in which the pressure connector 75 is in contact with the conducive fibers 30, and a second state in which the pressure connector 75 is separated from the conductive fibers 30. When pressure is exerted on the seat (e.g., when a user sits on the seat), the pressure connector 75 moves to the first state and the first connecting plate 77 comes into contact with the second connecting plate 79. The suspension material 16 is pressed between the first connecting plate 77 and the second connecting plate 79. Therefore, when the first connecting plate 77 and the second connecting plate 79 come into contact, the electronic circuit 100 also becomes connected to at least one conductive fiber 30. Otherwise, when no pressure is exerted on the seat, the pressure connector 75 remains in the second state.

Figure 7:
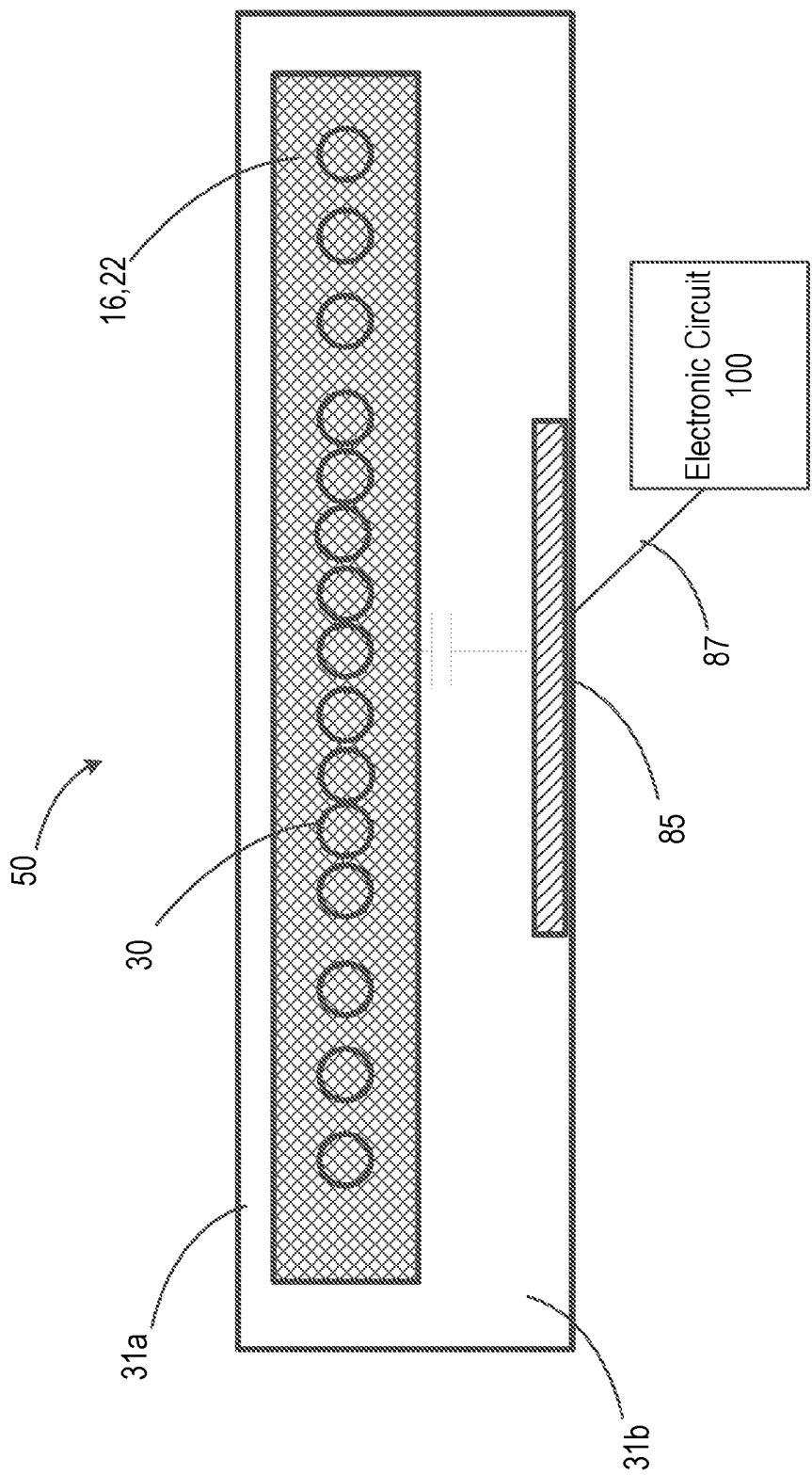
FIG. 7 is a schematic diagram of a fifth embodiment of the connection between the suspension material and the electronic circuit.

FIG. 7 illustrates another embodiment of the connection 50. In the illustrated embodiment, the connection 50 is a wireless connection. A conducting plate 85 (or capacitive electrode) is positioned in a first portion of the carrier 18, 24. The conducting plate 85 is positioned sufficiently close to (i.e., near) the conducting fibers 30 such that a capacitor is formed between the conducting plate 85 and the plurality of conducting fibers 30. In the embodiment of FIG. 7, a high density of conducting fibers 30 (e.g., a first subset of conducting fibers 30) is positioned close to the conducting plate 85. When the electronic circuit 100 provides a drive signal to the conducting plate 85 via, for example, a wire 87, the drive signal is transmitted to the conducting fibers 30 through the capacitance between the conducting plate 85 and the conducting fibers 30. Therefore, the conducting plate 85 wirelessly bridges the gap between the conducting fibers 30 and the other components of the electronic circuit 100.

Figure 8:
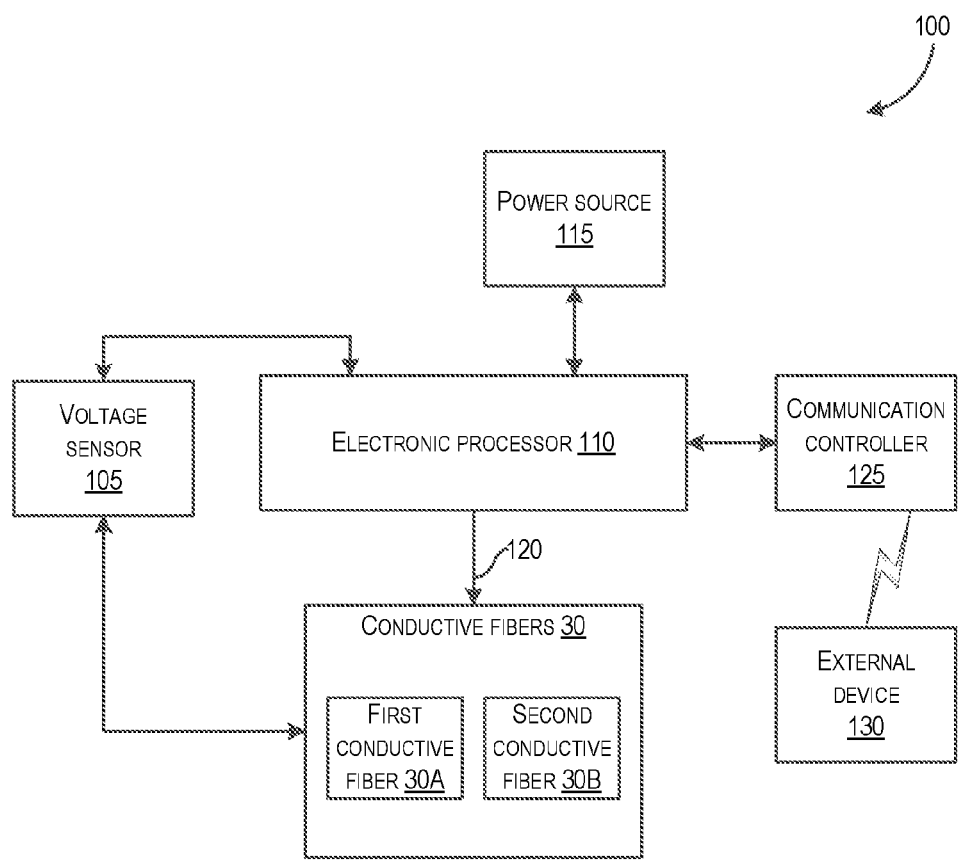
FIG. 8 is a block diagram of the electronic circuit.

FIG. 8 illustrates a block diagram of the electronic circuit 100. In some embodiments, the electronic circuit 100 may be positioned near the tilt control box 8 at the base of the seat. In other embodiments, the electronic circuit 100 is positioned elsewhere on the seating structure 1 (e.g., secured to the backrest 4). As shown in FIG. 8, the electronic circuit 100 includes a voltage sensor 105, an electronic processor 110, a power source 115, and a communication controller 125. The power source 115 provides electrical power to the electronic circuit 100. In some embodiments, the power source 115 may be, for example, a battery installed and carried by the seating structure 1. In other embodiments, the power source 115 may include circuitry configured to receive power from, for example, an AC voltage source (e.g., a wall outlet) and convert the received power to a usable form (e.g., 5, 12, or 24 Volts DC) for the electronic circuit 100. As shown in FIG. 8, the conductive fibers 30 are coupled to the electronic processor 110 to receive a drive signal 120 from the electronic processor 110. In some embodiments, the electronic processor 110 sends the drive signal 120 directly to the conductive fibers 30. In other embodiments, however, the electronic processor 110 sends a control signal to an electrical switch. The electrical switch may switch between a first state in which the drive signal 120 is not sent to the conductive fibers 30, and a second state in which the drive signal 120 is sent to the conductive fibers 30. The electrical switch changes states based on the control signal received from the electronic processor 110. The voltage sensor 105 is also coupled to the conductive fibers 30 to measure changes of the drive signal 120 and transmit its measurements to the electronic processor 110.

The communication controller 125 is coupled to the electronic processor 110 to transmit data signals including, for example, information regarding the measured changes to the drive signal 120 to an external device 130. In some embodiments, the external device 130 may include a laptop or desktop computer, a smartphone, a tablet computer, a server, and the like. The external device 130 may make additional determinations based on the data signal received from the communication controller 125. In one embodiment, the communication controller 125 includes a Bluetooth® controller configured to send and receive messages using the Bluetooth® communication standard. In other embodiments, the communication controller 125 may implement different communication standards between the external device 130 such as, for example, Zig-bee communications, near-field communications, and the like.

Figure 9:
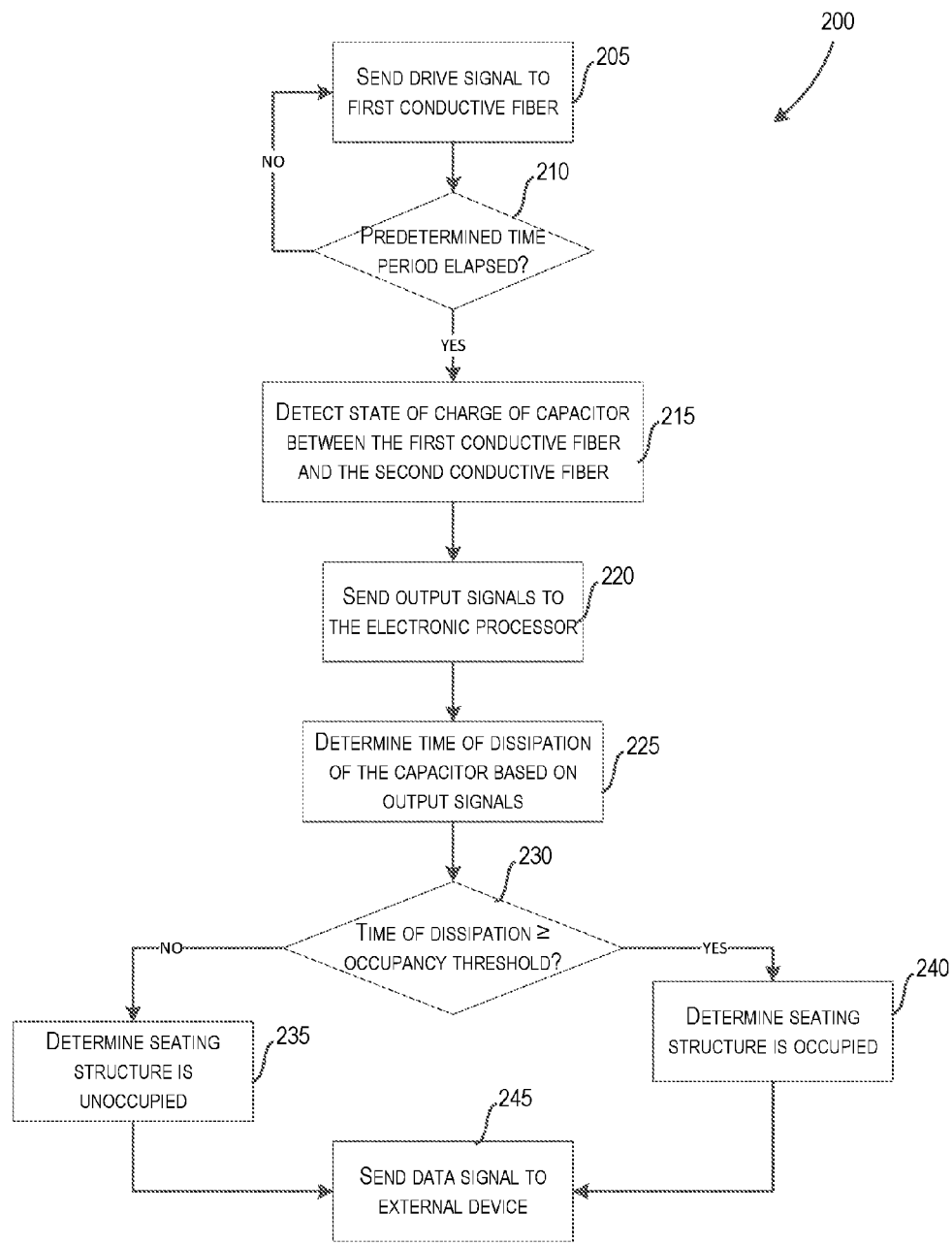
FIG. 9 is a flowchart illustrating a first method of operation of the electronic circuit and the suspension material.

FIG. 9 is a flowchart illustrating a first method 200 of operation of the electronic circuit 100 and the conductive fibers 30. In the first embodiment, the electronic processor 110 is coupled to a first conductive fiber 30a. The electronic processor 110 sends the drive signal 120 to the first conductive fiber 30a via the connection 50 (block 205). In the first embodiment, the drive signal 120 includes a voltage that is applied to the first conductive fiber 30a. The voltage is applied to the first conductive fiber 30a for a predetermined time period. The electronic processor 110 determines whether the predetermined time period has elapsed (block 210). When the predetermined time period has not elapsed, the electronic processor 110 continues to provide the drive signal 120 to the first conductive fiber 30a (block 205). On the other hand, once the predetermined time period elapses, the electronic processor 110 ceases to apply the voltage drive signal to the first conductive fiber 30a. Due to the proximity and parallel nature of the conductive fibers 30, when the drive signal (e.g., the voltage signal) is applied to the first conductive fiber 30a, a capacitor is formed between the first conductive fiber 30a and a second conductive fiber 30b.

In the first embodiment, the voltage sensor 105 is coupled to the first conductive fiber 30a and/or the second conductive fiber 30b. The voltage sensor 105 detects the voltage (e.g., the state of charge) of the capacitor that is formed between the first conductive fiber 30a and the second conductive fiber 30b (block 215). The voltage sensor 105 then sends a plurality of output signals (e.g., measurements of the state of charge of the capacitor) to the electronic processor 110 (block 220). In one embodiment, the voltage sensor 105 sends a measurement of the state of charge of the capacitor at a predetermined rate (e.g., one measurement every 20 milliseconds). In other embodiments, the voltage sensor 105 sends a measurement of the state of charge of the capacitor once when the capacitor is fully charged and again at a predetermined time later (e.g., after 20 seconds of the capacitor becoming fully charged). The electronic processor 110 then determines the time of dissipation of the capacitor based on the plurality of measurements from the voltage sensor 105 (block 225). The electronic processor 110 may, for example, monitor the measured state of charge of the capacitor and determine when the measured state of charge of the capacitor has reached a predetermined low voltage threshold. The time of dissipation of the capacitor may then be calculated based on the time difference between the capacitor being fully charged and the capacitor reaching the low voltage threshold. The electronic processor 110 determines whether the calculated time of dissipation exceeds an occupancy threshold (block 230). The occupancy threshold helps the electronic processor 110 determine whether a user is occupying the seating structure 1. When a user approaches the capacitor formed between the first conductive fiber 30a and the second conductive fiber 30b, the user's capacitance is added in parallel to the capacitance of the capacitor of the conductive fibers 30. Adding a parallel capacitance increases the overall capacitance, which increases also the time of dissipation.

Accordingly, when the time of dissipation is below the occupancy threshold, the electronic processor 110 determines that the seating structure 1 is unoccupied (block 235). On the other hand, when the time of dissipation exceeds the occupancy threshold, the electronic processor 110 determines that the seating structure 1 is occupied by a user (block 240). In some embodiments, the method 200 also includes sending a data signal to the external device 130 (e.g., via the communication controller 125) regarding the state of the seating structure 1 (block 245).

Figure 10:
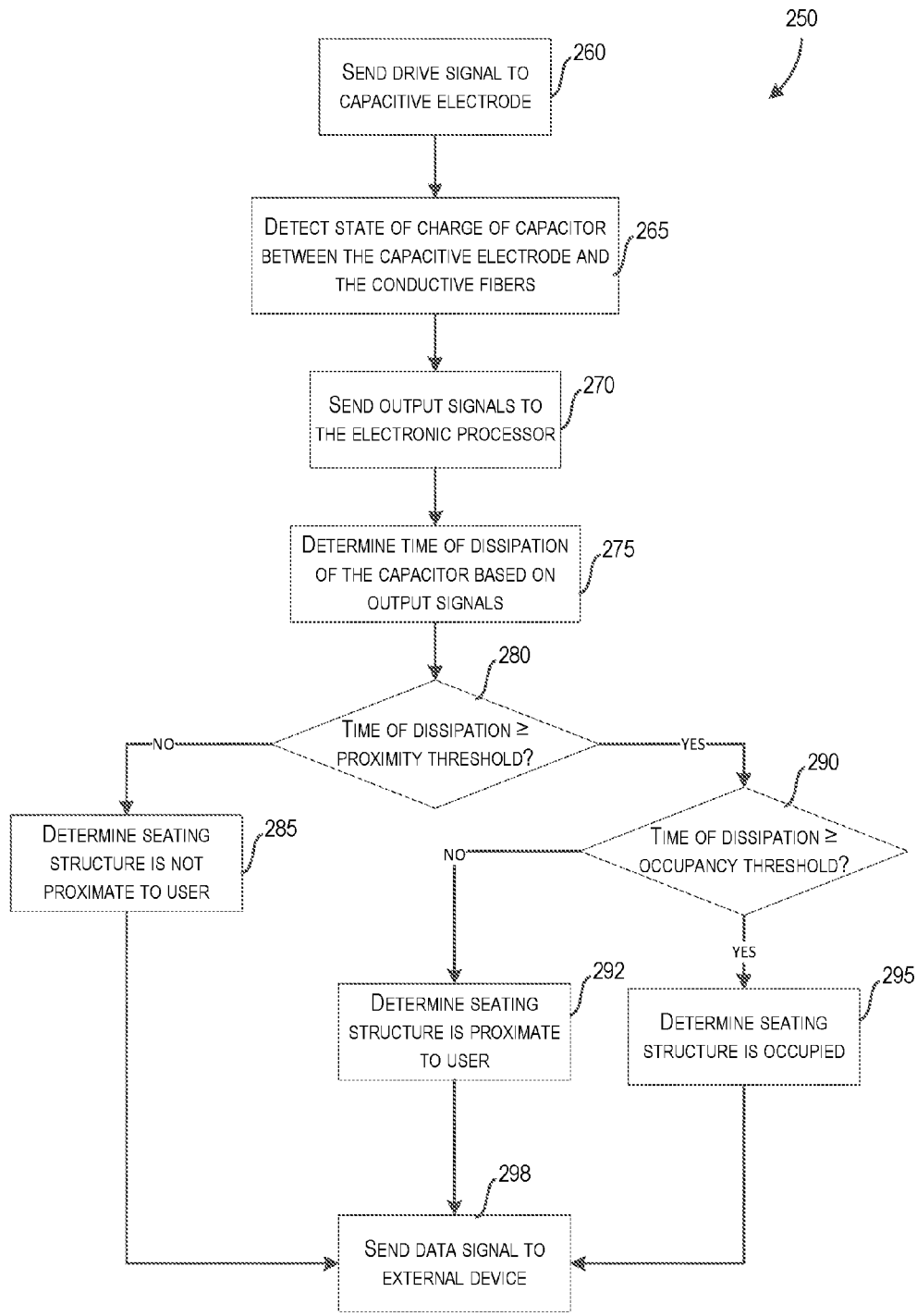
FIG. 10 is a flowchart illustrating a second method of operation of the electronic circuit and the suspension material.
Figure 11:
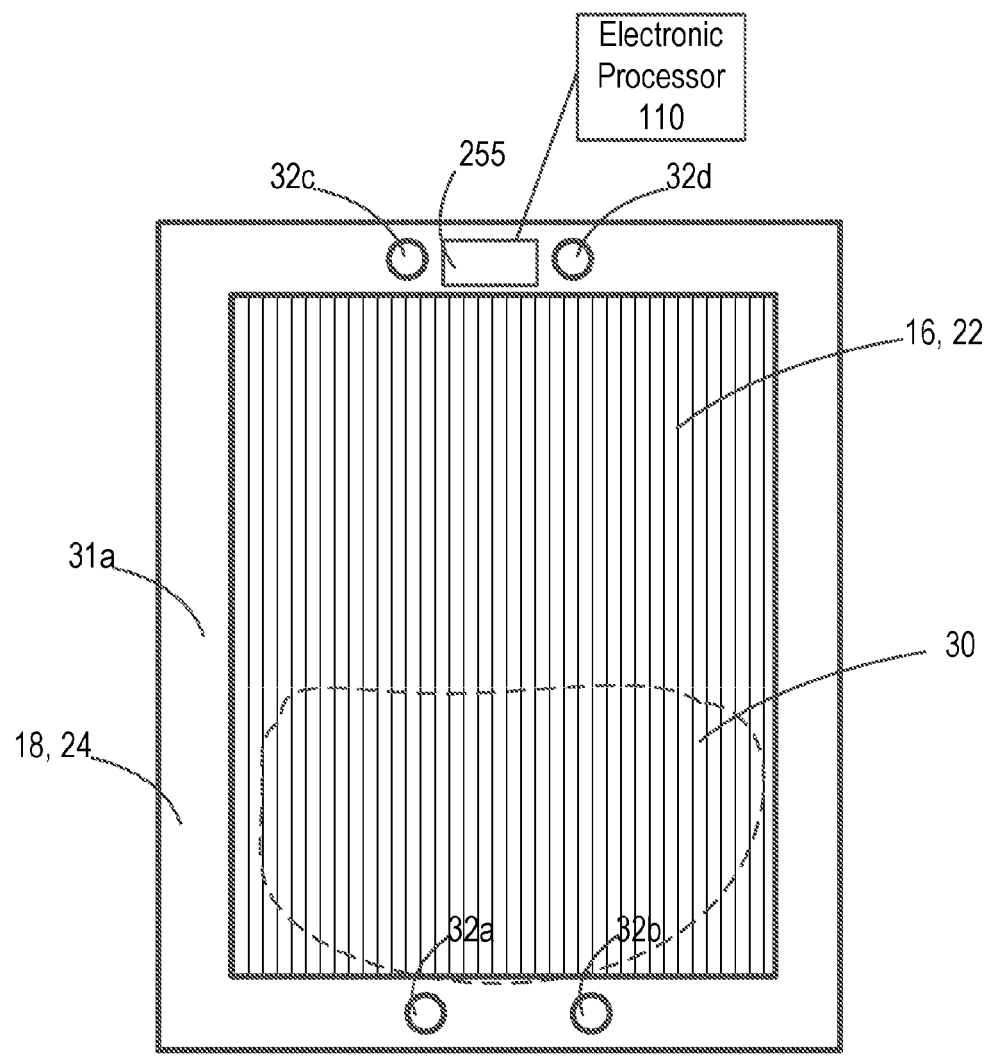
FIG. 11 is a schematic diagram of an embodiment of the seating structure.

FIG. 10 is a flowchart illustrating a second method 250 of operation of the electronic circuit 100 and the conductive fibers 30. As shown in FIG. 11, in the second embodiment, the seating structure 1 also includes a capacitive electrode 255 (for example, similar to the conducting plate 85 discussed above with respect to FIG. 7). In the illustrated embodiment, the capacitive electrode 255 is positioned at a first end of the carrier 18, 24 (e.g., the back end of the seat carrier 18). The capacitive electrode 255 is coupled to the electronic processor 110 and is spaced apart from the conductive fibers 30. The electronic processor 110 sends the drive signal (e.g., an applied voltage) to the capacitive electrode 255 (block 260). The capacitive electrode 255 forms a capacitor with conductive fibers 30 that are positioned on a second end of the carrier 18, 24 (e.g., the front end of the seat carrier 18), as shown schematically on FIG. 11. That is, the application of the drive signal forms a capacitive field between the capacitive electrode 255 and the conductive fibers 30. The voltage (e.g., the drive signal 120) applied to the capacitive electrode 255 charges the capacitor formed between the capacitive electrode 255 and the conductive fibers 30 at the opposite end of the carrier 18, 24. In the embodiment of FIG. 11, the voltage sensor 105 may be coupled to the conductive fibers 30 via the connection 50 or directly with the capacitive electrode 255. The voltage sensor 105 detects the voltage (e.g., the state of charge) of the capacitor that is formed between the capacitive electrode 255 and the conductive fibers 30 (block 265). The voltage sensor 105 sends a plurality of measurements of the state of charge of the capacitor to the electronic processor 110 (block 270). As discussed above with respect to FIG. 9, in one embodiment, the voltage sensor 105 periodically sends a voltage measurement signal to the electronic processor 110 at a predetermined frequency (or rate). In other embodiments, however, the voltage sensor 105 only sends the electronic processor 110 two measurements, a first voltage measurement when the capacitor is fully charged, and another at a predetermined time later (e.g., after 20 seconds).

The electronic processor 110 then determines, based on the received voltage measurements, a time of dissipation (or a rate of discharge) of the capacitor (block 275). The electronic processor 110 then determines whether the time of dissipation exceeds a proximity threshold (block 280). When the time of dissipation is below the proximity threshold (e.g., the capacitor discharges faster than the proximity threshold), the electronic processor 110 determines that the seating structure 1 is not near a user (block 285). On the other hand, when the time of dissipation exceeds the proximity threshold (e.g., the capacitor remains charged for longer), the electronic processor 110 determines that a user is near (e.g., in contact with or almost touching) the seating structure 1 and proceeds to determine whether the time of dissipation also exceeds an occupancy threshold (290). When the time of dissipation is below the occupancy threshold, the electronic processor 110 determines that the seating structure 1 is near a user (block 292). On the other hand, when the time of dissipation exceeds the occupancy threshold, the electronic processor 110 determines that the seating structure 1 is occupied by a user (block 295). Using the capacitive electrode 255 allows for a larger capacitor to be formed by the conductive fibers 30, as compared to the capacitor formed between adjacent conductive fibers 30. The larger capacitor then allows the time of dissipation to be compared both to a proximity threshold and to an occupancy threshold, as described above with respect to blocks 280 and 290. In the illustrated embodiment, the communication controller 125 sends a data signal indicative of the state of the seating structure to the external device 130 (block 298).

Figure 12:
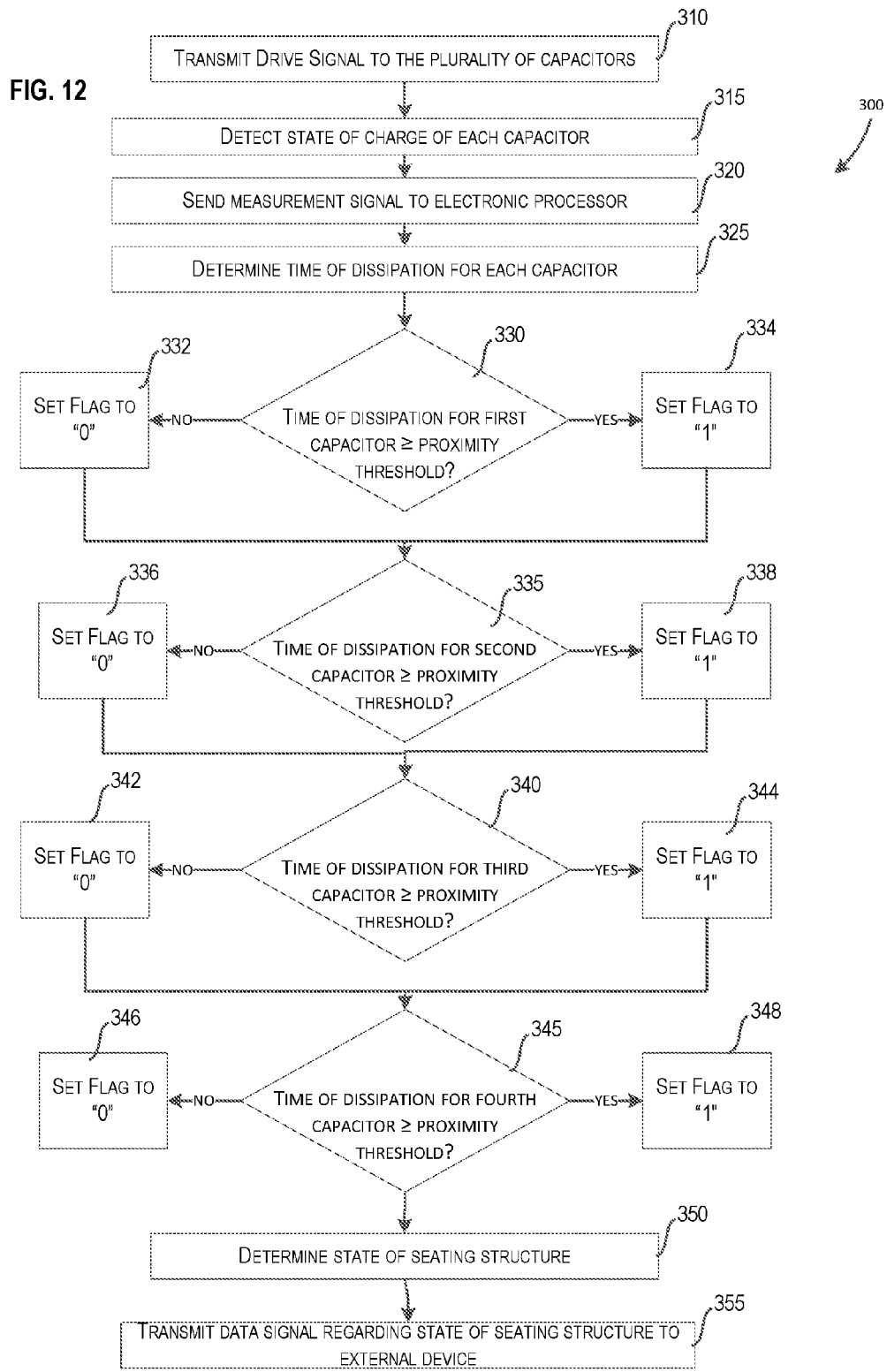
FIG. 12 is a flowchart illustrating a third method of operation of the electronic circuit and the suspension material.
Figure 13:
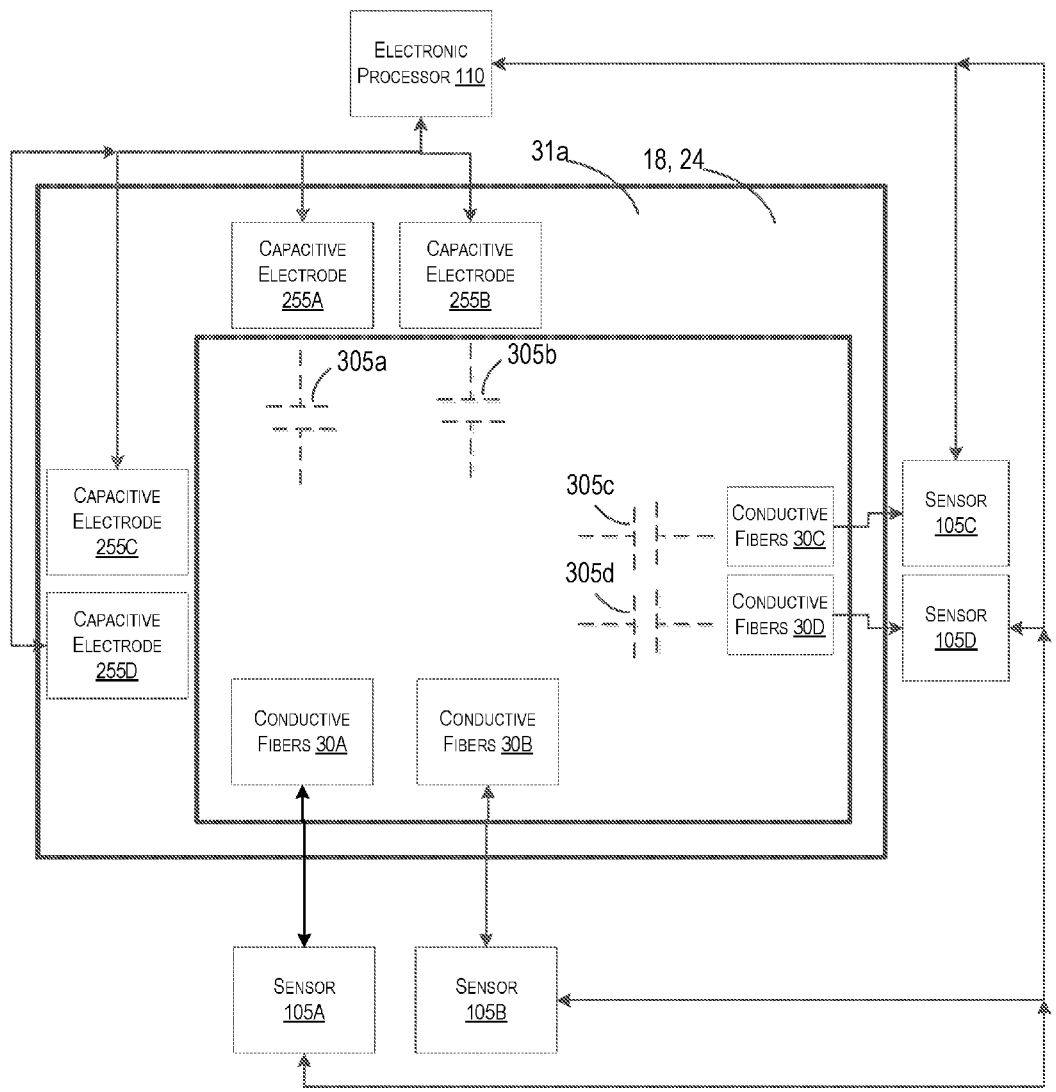
FIG. 13 is a schematic diagram of another embodiment of the seating structure.

FIG. 12 is a flowchart illustrating a third method 300 of operation of the electronic circuit 100 and the conductive fibers 30. In the third embodiment, the seating structure includes a plurality of the capacitive electrodes 255a-d, as shown in FIG. 13. Each of the capacitive electrodes 255a-d forms a capacitor with a subset of conductive fibers 30a-d, respectively, to form a total of four capacitors 305a-d. As shown in FIG. 13, the four capacitors 305a-d are arranged in a grid pattern. The connection of each of the subsets of conductive fibers 30a-d is similar to the connection 50 described with respect to the first conductive fiber 30a in FIGS. 3-8. As also shown in FIG. 13, in the third embodiment, one electrode (e.g., the capacitive electrode 255a-d or the conductive fiber 30a-d) of each of the capacitors 305a-d is coupled to the electronic processor 110 to receive the drive signal 120, while the other end (e.g., the other of the capacitive electrode 255a-d or the conductive fiber 30a-d) is coupled to a voltage sensor 105a-d each. In other embodiments, the seating structure may include fewer or more capacitive electrodes forming fewer or more capacitors with the conductive fibers.

In the third method, the electronic processor 110 applies the drive signal 120 (e.g., a voltage signal) to each of the four capacitors 305a-d (block 310). In particular, the electronic processor 110 applies the drive signal 120 to each of the capacitive electrodes 255a-d. Each voltage sensor 105a-d then detects the state of charge of its respective capacitor 305a-d (block 315) and sends the voltage measurement signal to the electronic processor 110 (block 320). The electronic processor 110 determines a time of dissipation for each of the capacitors 305a-d (block 325). The electronic processor 110 then determines whether the time of dissipation for the first capacitor 305a exceeds a proximity threshold (block 330). When the time of dissipation is below the proximity threshold, the electronic processor 110 sets a flag associated with the first capacitor 305a to "0" (block 332). When the time of dissipation for the first capacitor 305 exceeds the proximity threshold, the electronic processor 110 sets the flag associated with the first capacitor 305a to "1" (block 334). The electronic processor 110 also determines whether the time of dissipation for the second capacitor 305b exceeds the proximity threshold (block 335). When the time of dissipation for the second capacitor 305b is below the proximity threshold, the electronic processor 110 sets a flag associated with the second capacitor 305b to "0" (block 336). When the time of dissipation for the second capacitor 305b exceeds the proximity threshold, the electronic processor 110 sets the flag associated with the second capacitor 305b to "1" (block 338). The electronic processor 110 proceeds to determine whether the time of dissipation for the third capacitor 305c exceeds the proximity threshold (block 340) and whether the time of dissipation for the fourth capacitor 305d exceeds the proximity threshold (block 345). Based on whether the times of dissipation exceed the proximity threshold, the electronic processor 110 sets the flags associated with the corresponding capacitor (e.g., third or fourth capacitor 305c-d) to the appropriate value (blocks 342, 344, 346, 348) as described above with respect to block 332, 334, 336, and 338.

The electronic processor 110 then determines, based on which times of dissipation exceed the proximity threshold, a state of the seating structure 1 (block 350). For example, when none of the times of dissipation exceed the proximity threshold, the electronic processor 110 determines that the seating structure 1 is unoccupied and far from a user. In another example when three of more times of dissipation exceed the proximity threshold, the electronic processor 110 determines that the seating structure 1 is occupied by a user. In yet another example, when only two times of dissipation exceed the proximity threshold, the electronic processor 110 determines that a user is proximate to the seating structure 1, and may, in some embodiments, determine a specific area to which the user is near. By arranging the capacitors 305a-d in a grid array, a more accurate determination of the area occupied by the user and/or the area proximate to the user is determined by the electronic processor 110. The communication controller 125 then transmits a data signal regarding the state of the seating structure 1 to the external device 130 (block 355).

Although FIG. 13 illustrates four distinct voltage sensors 105a-d, in some embodiments, a single voltage sensor 105 can measure the state of charge of the four capacitors 305a-d. For example, the voltage sensor 105 may be connected to each of the four capacitors 305a-d via switches (or another selection mechanism) that are opened and closed to determine the state of charge of each capacitor 305a-d.

While FIGS. 9-13 are described as sending a voltage signal to capacitors formed by the conductive fibers 30, the methods described with respect to FIGS. 14-17 apply a radio frequency signal to the conductive fibers 30 and determine a state of the seating structure 1 based on the attenuation experienced by the radio frequency signal.

Figure 14:
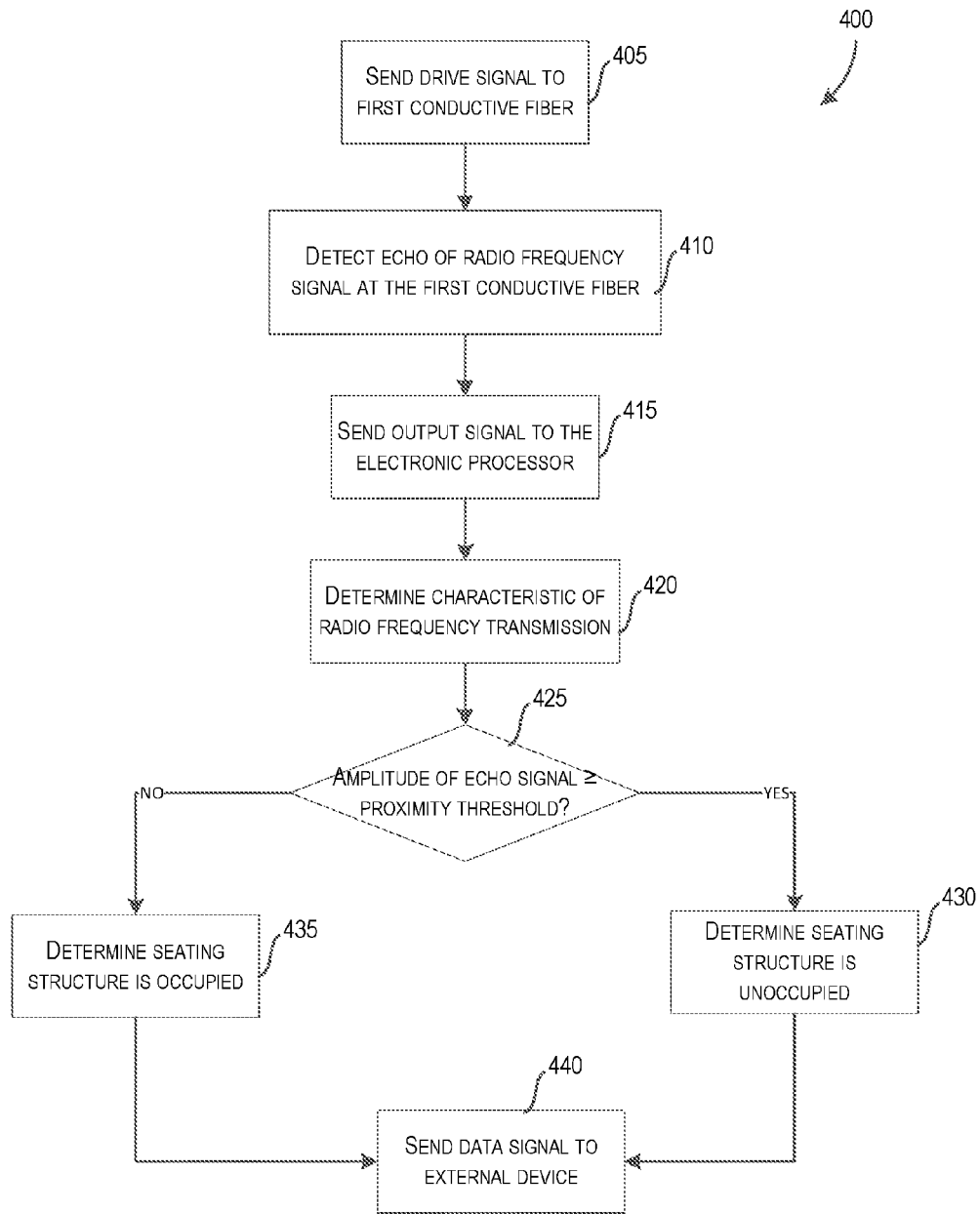
FIG. 14 is a flowchart illustrating a fourth method of operation of the electronic circuit and the suspension material.

FIG. 14 is a flowchart illustrating a fourth method 400 of operation of the electronic circuit 100 and the conductive fibers 30. In the fourth embodiment, the electronic processor 110 sends the drive signal 120 to the first conductive fiber 30a (block 405). In the fourth embodiment, the drive signal 120 includes a radio frequency signal that is pulsed (e.g., transmitted) through the first conductive fiber 30a. The radio frequency signal includes a predetermined amplitude and frequency. When the radio frequency signal (e.g., the drive signal 120) is pulsed at the connection 50, the radio frequency signal travels through the length of the first conductive fiber 30a. Upon reaching the end of the length of the first conductive fiber 30a (e.g., the front or opposite end of the carrier 18, 24), an echo of the radio frequency signal bounces back to the connection 50 (e.g., the originating position of the signal). The echo signal may also be referred to as a response signal (e.g., responding to the radio frequency signal). In the second embodiment, the voltage sensor 105 is coupled to the first conductive fiber 30a and detects the echo signal of the radio frequency signal (block 410). The voltage sensor 105 then sends the measurement of the amplitude of the radio frequency signal to the electronic processor 110 (block 415).

The electronic processor 110 determines a characteristic of the radio frequency transmission (block 420). In one embodiment, the electronic processor 110 determines a time of transmission. For example, the electronic processor 110 determines the delay between transmitting the radio frequency signal at the connection 50 and receiving the echo of the radio frequency signal to determine a time of transmission. In other embodiments, the electronic processor 110 determines the amplitude of the received echo of the radio frequency signal. When a user approaches the seating structure 1, the user interferes with the exchange of radio frequency signals between the conductive fibers 30. Therefore, when a user approaches the seating structure, the time of transmission increases (e.g., the radio frequency signal requires more time to reach its destination) and the amplitude of the received signal decreases. In the example of FIG. 14, the electronic processor 110 determines the amplitude of the received signal. The electronic processor 110 then determines whether the measured characteristic (in this example, the amplitude of the received signal) exceeds a proximity threshold (block 425). When the amplitude of the received signal exceeds the proximity threshold, the electronic processor 110 determines that no (or little) interference was present and therefore the seating structure 1 is unoccupied (block 430). When, on the other hand, the amplitude of the received signal is below the proximity threshold, the electronic processor 110 determines that the seating structure 1 is occupied (due to the introduced interference by the user) at block 435. The communication controller 125 then transmits a data signal to the external device 130 indicating the state of the seating structure 1 (block 440).

Figure 15:
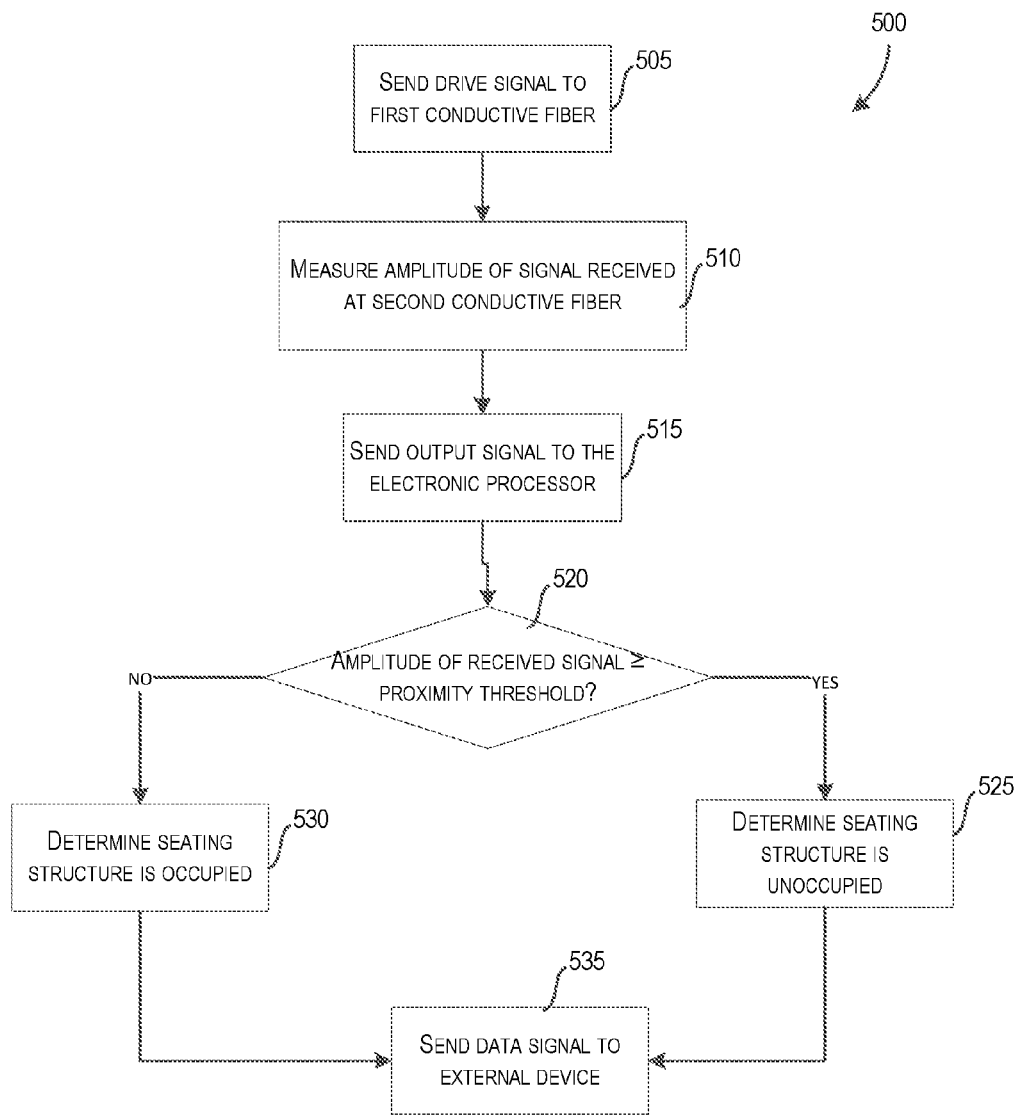
FIG. 15 is a flowchart illustrating a fifth method of operation of the electronic circuit and the suspension material.

FIG. 15 is a flowchart illustrating a fifth method 500 of operation of the electronic circuit 100 and the conductive fibers 30. The fifth method 500 is similar to the fourth method 400 of operation illustrated in FIG. 14, but differs in that the voltage sensor 105 is coupled to a second conductive fiber 30b rather than the first conductive fiber 30a. In the fifth method 500, the electronic processor 110 again pulses a radio frequency signal to the first conductive fiber 30a (step 505). The voltage sensor 105 detects a receipt of the transmitted radio frequency signal at the second conductive fiber 30b. In some embodiment, the second conductive fiber 30b is adjacent the first conductive fiber 30a. The voltage sensor 105 measures the amplitude of the received signal (block 510) and sends the measured voltage to the electronic processor 110 (block 515). The electronic processor 110 then determines whether the amplitude of the received signal exceeds a proximity threshold (block 520). When the amplitude of the received signal exceeds the proximity threshold, the electronic processor 110 determines the seating structure 1 is unoccupied (block 525). On the other hand, when the amplitude of the received signal is below the proximity threshold, the electronic processor 110 determines the seating structure 1 is occupied (block 530). The communication controller 125 then transmits a data signal to the external device 130 indicating the state of the seating structure 1 (block 535). In some embodiments, the electronic processor 110 may additionally or alternatively determine the delay between sending the drive signal 120 at the first conductive fiber 30a and receiving the signal at the second conductive fiber 30b. The electronic processor 110 may then determine whether the time delay exceeds the proximity threshold.

In another embodiment, the electronic processor 110 is coupled to the first conductive fiber 30a at a first end (e.g., an end of the first conductive fiber 30a positioned at the back of the seating structure 1) and the voltage sensor 105 is coupled to the first conductive fiber 30a at a second end (e.g., an end of the first conductive fiber 30a positioned at the front of the seating structure 1). In such embodiments, the electronic processor 110 sends the drive signal 120 from the first end of the first conductive fiber 30a and the voltage sensor 105 detects the received signal at the second end of the first conductive fiber 30*a*. The electronic processor 110 may then determine a characteristic of the transmission (e.g., the time of transmission and/or power of the received signal) and compare the determined characteristic of transmission to, for example, an occupancy and/or a proximity threshold, as described above with respect to FIGS. 14 and 15. The electronic processor 110 may then, based on the comparison of the characteristic of transmission and the occupancy and/or proximity threshold, determine a state of the seating structure 1 (e.g., whether the seating structure 1 is occupied and/or near a user).

Figure 16:
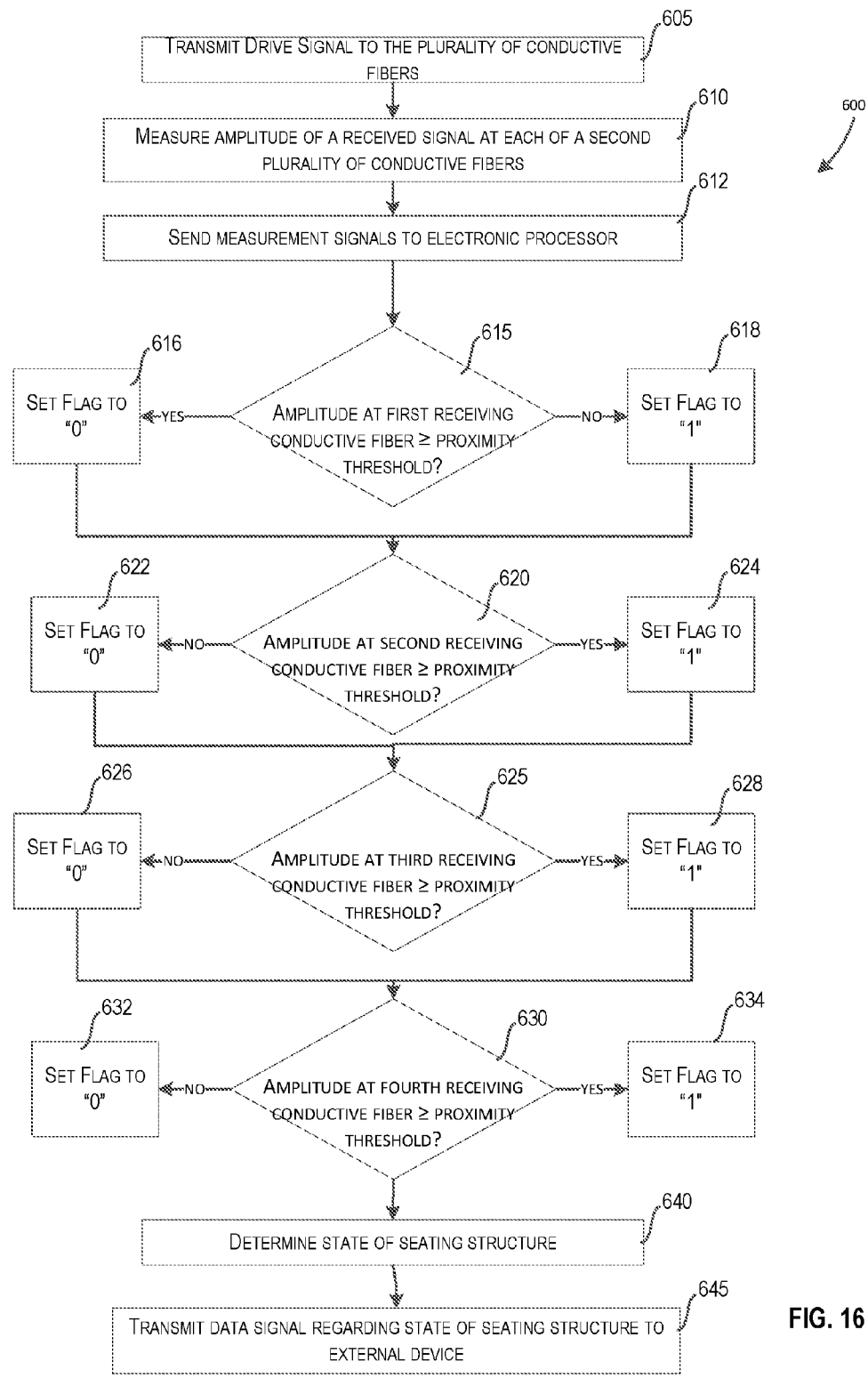
FIG. 16 is a flowchart illustrating a sixth method of operation of the electronic circuit and the suspension material.
Figure 17:
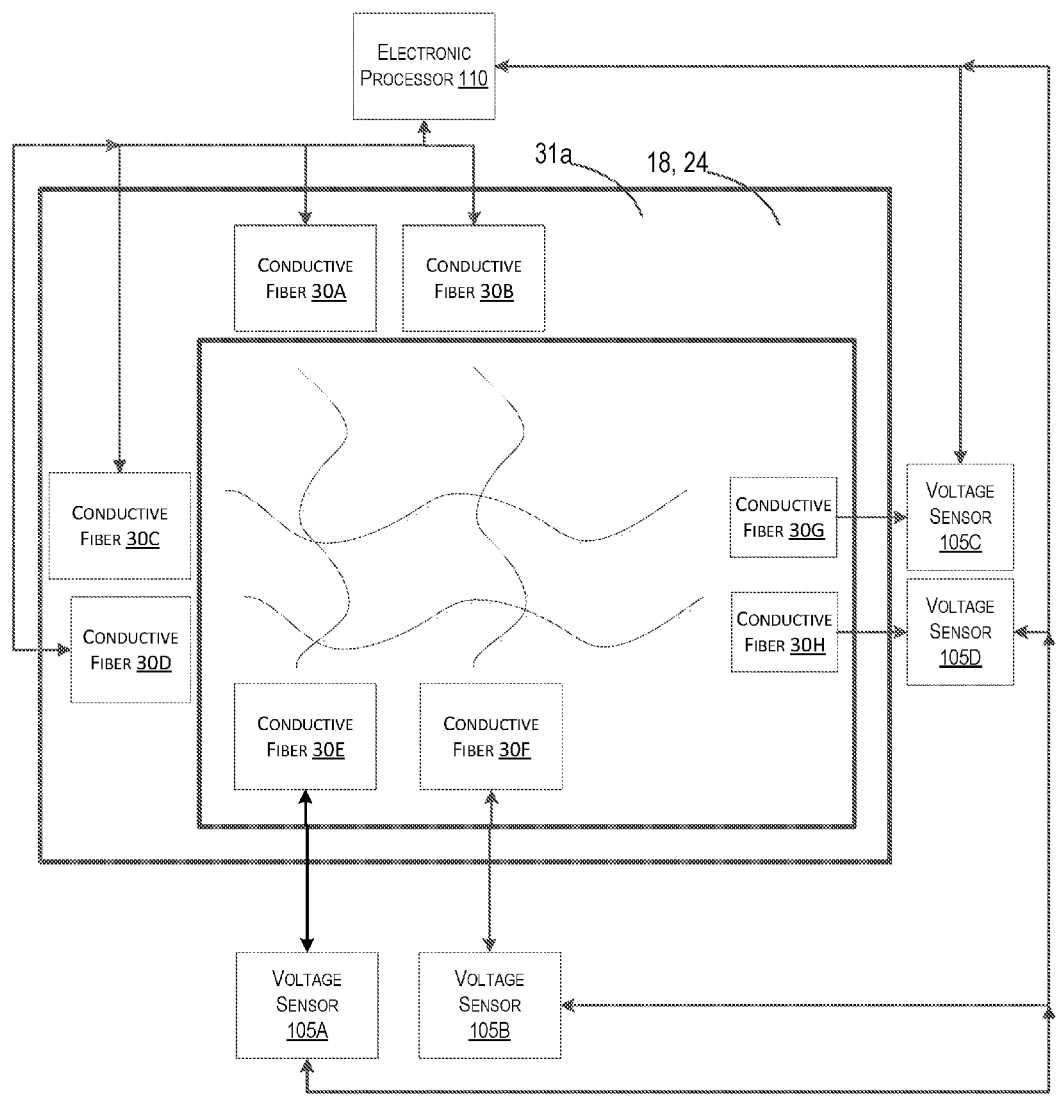
FIG. 17 is a schematic diagram of another embodiment of the seating structure.

FIG. 16 is a flowchart illustrating a sixth method 600 of operation of the electrical circuit 100 and the conductive fibers 30. In the sixth embodiment, the electronic processor 110 transmits the drive signal 120 (e.g., a radio frequency signal) to a plurality of conductive fibers 30*a-d* (block 605). In the sixth embodiment, as shown in FIG. 17, a voltage sensor 105*a-d* is coupled to each conductive fiber 30*e-h* of another set (e.g., a second plurality) of conductive fibers 30*e-h*. Each of the first plurality of conductive fibers 30*a-d* transmits the drive signal to the corresponding conductive fiber of the second plurality of conductive fibers 30*e-h*. As shown in FIG. 17, the pairs of transmitting and receiving conductive fibers 30 are positioned in a grid array (e.g., similar to the distribution of the capacitors of FIG. 13).

Each voltage sensor 105 then measures an amplitude of the received signal at each of the second plurality of conductive fibers 30*e-h* (block 610), and sends the measurement signals (e.g., output signals) to the electronic processor 110 (block 612). The electronic processor 110 then determines whether the amplitude of the received signal at the first receiving conductive fiber 30*e* exceeds the proximity threshold (block 615). When the amplitude of the received signal at the first receiving conductive fiber 30*a* exceeds the proximity threshold, the electronic processor 110 sets a flag associated with the first receiving conductive fiber 30*a* to "0" (block 616). When the amplitude of the received signal is below the proximity threshold, the electronic processor 110 sets a flag associated with the first receiving conductive fiber 30*a* to "1" (block 618). Similarly, the electronic processor 110 proceeds to determine whether the amplitude of the received signals exceeds the proximity threshold (blocks 620, 625, 630). The electronic processor 110 also sets the appropriate flags based on the amplitude of the received signals (blocks 622, 624, 626, 628, 632, 634) as described above for steps 616 and 618.

The electronic processor 110 then determines, based on the amplitudes of the received signals, a state of the seating structure 1 (block 640). For example, when none of the amplitudes exceed the proximity threshold, the electronic processor 110 determines that the seating structure 1 is occupied by a user. In another example, when three of more amplitudes or the received signals are below the proximity threshold, the electronic processor 110 determines that the seating structure 1 is occupied by a user. In yet another example, when only two amplitudes remain below the proximity threshold, the electronic processor 110 determines that a user is proximate to the seating structure 1, and may, in some embodiments, determine a specific area to which the user is near. By arranging the sensitive conductive fibers 30 in a grid array, a more accurate determination of the area occupied by the user and/or the area proximate to the user is determined by the electronic processor 110. The communication controller 125 then transmits a data signal regarding the state of the seating structure 1 to the external device 130 (block 645).

Although FIGS. 9-13 describe the use of capacitance measurements to determine a presence of an object and FIGS. 14-16 describe the use of radio frequency signals to determine a state of the seating structure 1, in some embodiments, the electronic circuit 100 may monitor both capacitance measurement and radio frequency signals to determine the state of the seating structure 1 (e.g., whether the seating structure 1 is occupied). Additionally, FIGS. 9-16 describe the communication controller 125 sending a data signal to the external device 130. In some embodiments, the data signal does not include the status of the seating structure. Rather, the data signal includes the measurement of the time of dissipation and/or the amplitude of the received signal. The external device 130 then determines whether the seating structure 1 is occupied by a user.

The seating structure 1 has been described as including a capacitive circuit and/or a radio frequency circuit in either the seat 2 or the backrest 4. In some embodiments, the seating structure 1 may include a sensing circuit (e.g., the capacitive circuit and/or the radio frequency circuit) formed with the suspension material 16 of the seat 2 and a second sensing circuit formed with the suspension material 22 of the backrest 4. In such embodiments, the electronic processor 110 may use each sensing circuit to confirm the state of the seating structure 1 (e.g., whether the seating structure 1 is occupied by the user) and/or to gain more insight regarding the use of the seating structure 1.

In some embodiments, the sensing circuit (e.g., the capacitive circuit and/or the radio frequency circuit) may be calibrated to determine the values for the occupancy threshold and the proximity threshold. In some embodiments, the electronic processor 110 also determines a position of a user while occupying the seating structure 1 based on the measurements from the voltage sensor 105. For example, the electronic processor 110 may determine whether a user is utilizing the backrest 4. The electronic processor 110 may receive an output signal from a voltage sensor 105 coupled to the suspension material of the backrest 4, and determine, based on the output signal, whether a user leans against the backrest 4. In some embodiments, the electronic processor 110 may additionally or alternatively differentiate between the user sitting in different portions of the seating structure 1 (e.g., toward the front of the seating structure 1, on one side (right or left) of the seating structure 1, and the like).

Additionally or alternatively, the electronic processor 110 determines a posture of the user while occupying the seating structure 1. In some embodiments, a user's posture may be classified into an upright posture, a slouching posture, a perching posture, and a relaxed posture. The electronic processor 110 may then monitor the measurements from the voltage sensor 105 to determine a user's current posture. For example, the electronic processor 110 may determine that a user is in an upright position when a voltage sensor coupled to the seat 2 indicates that the seating structure 1 is occupied by the user, but a voltage sensor coupled to the backrest 4 indicates that a user is not resting on the backrest 4. In another example, the seat 2 and/or the backrest 4 may include a plurality of capacitive and/or radio frequency circuits. The electronic processor 110 may then determine, based on the measurements from the different capacitive and/or radio frequency circuits, which portion of the seating structure 1 supports more pressure from the user (e.g., whether a user is leaning toward the front of the seat 2). Such determinations may help the electronic processor 110 classify the current posture of the user.

In other embodiments, the electronic processor 110 may additionally or alternatively determine a biometric characteristic of a user (e.g., temperature, heart rate, and the like). In such embodiments, the seating structure 1 may include strategically placed capacitive and/or radio frequency circuits (e.g., formed by the suspension materials 16, 22) based on which biometric characteristic is measured. For example, when the electronic processor 110 determines a heart rate of the user, the seating structure 1 may include the capacitive and/or radio frequency circuit on the backrest 4 at a height that corresponds to the user's mid-back. The capacitive and/or radio frequency circuit may then detect changes in capacitance and/or radio transmission based on the user's heart rate (e.g., based on an electrocardiogram wave). In some embodiments, it may be useful to filter the detected capacitance and/or radio transmissions such that smaller changes are detected by the electronic processor 110. In other embodiments, the electronic processor 110 may use a variety of thresholds (e.g., capacitance thresholds, time of transmission threshold, transmission power thresholds, and the like) to differentiate between the user's different heart rates (or heart rate ranges such as high heart rate, low heart rate, average heart rate) or other biometric characteristics.

In some embodiments, the seating structure 1 includes additional sensors to detect biometric characteristics of a user. For example, the seating structure 1 may include temperature sensors (e.g., thermocouples) to monitor the temperature of a user. In some embodiments, some of the conductive fibers 30 may be specifically designed to serve as these additional sensors (e.g., by making some of the conductive fibers 30 of different materials and/or applying a coating on the conductive fibers 30).

In some embodiments, the electronic processor 110 may additionally or alternatively determine certain environmental conditions. For example, humidity, static potential, temperature, and other environmental conditions may affect the radio frequency transmission and/or the capacitance of the conductive fibers 30. In such embodiments, the electronic processor 110 compares the measurements from the voltage sensor 105 (or a plurality of voltage sensors if more than one sensor is coupled to the seating structure 1) to particular thresholds. Each threshold is associated with changes to a particular environmental condition. For example, the electronic processor 110 may compare the measurements from the voltage sensor 105 to a temperature threshold, a humidity threshold, a static potential threshold, and/or a combination thereof. Based on such a comparison, the electronic processor 110 may determine changes to the environmental conditions and/or specific ranges for certain environmental conditions.

In some embodiments, as described previously, the electronic processor 110 may be included as part of the seating structure 1 (e.g., as part of the control circuit 100). In other embodiments, however, the electronic processor 110 is located at a remote location from the seating structure 1. In such embodiments, the voltage sensor 105 communicates directly with the communication controller 125 and transmits the measurements to the electronic processor 110 via the communication controller 125. In such embodiment, the electronic processor 110 may be included, for example, as part of the external device 130. In other embodiments, the electronic processor 110 is supported by the seating structure 1 and makes some determinations (e.g., whether the seating structure 1 is occupied) based on the measurements from the voltage sensor 105, but another set of determinations (e.g., a posture of the user, a biometric characteristic of the user, and/or an environmental condition) are made by a remote processor (e.g., a processor included in the external device 130). In some embodiments, the determinations made by the external device 130 may be more complex than the determinations made by the electronic processor 110 supported by the seating structure 1. In some embodiments, the electronic processor 110 may use only current output signals from the voltage sensor 105 to determine a state of the seating structure 1, while the external device 130 may access previous measurements from the voltage sensor 105 to determine different states of the seating structure 1.

In some embodiments, after the electronic processor 110 determines whether the seat is occupied, unoccupied, or proximate to the user, the electronic processor 110 transmits a signal to the external device 130 indicative of the state of the seating structure 1. In some embodiments, in response to determining the state of the seating structure, the electronic processor 110 activates a motor to change a position of the seating structure 1 or a different furniture item. For example, the seating structure 1 may include one or more motors to change the height of the seating structure 1, the angle of the backrest 4 with respect to the seat 2, and the like. When the electronic processor 110 determines that the seating structure 1 is occupied, the electronic processor 110 may activate one or more of the motors of the seating structure 1 to predetermined positions (e.g., a sitting height associated with the user). In another example, a nearby desk includes motors to rise and lower the height of a work surface of the desk. In such embodiments, the electronic processor 110 may transmit a command to the nearby desk to change its position in response to determining that the seat structure is occupied or that the seat structure is proximate to a user.

Thus, the invention provides, among other things, a seating structure having suspension conductive fibers used as electrical sensors to detect whether the seating structure is occupied or other user or environmental conditions. Various features and advantages of the invention are set forth in the following claims.

What is claimed is:

1. A seating structure comprising:
   a base;
   a seat supported by the base;
   a backrest coupled to the seat, wherein the seat, the backrest, or both includes a carrier and a suspension material secured to the carrier and spanning across an opening formed by the carrier, the suspension material including a plurality of electrostatic discharge fibers; and
   an electronic circuit supported by the base and coupled to at least one of the plurality of electrostatic discharge fibers, the electronic circuit including
      a sensor configured to generate an output signal indicative of an electrical parameter of one of the plurality of electrostatic discharge fibers, and
      an electronic processor coupled to the sensor, the electronic processor configured to
         apply a drive signal to one of the plurality of electrostatic discharge fibers,
         receive the output signal from the sensor, and
         determine, based on the output signal from the sensor, a state of the seating structure.

2. The seating structure of claim 1, wherein the carrier includes a fastener to connect the suspension material to the carrier, wherein the fastener is positioned in contact with the at least one of the plurality of electrostatic discharge fibers, and wherein the electronic processor is coupled to the at least one of the plurality of electrostatic discharge fibers via the fastener.

3. The seating structure of claim 1, wherein the carrier supports a pressure connector positioned adjacent one of the plurality of electrostatic discharge fibers, wherein the pressure connector switches between a first state in which the pressure connector is in contact with the one of the plurality of electrostatic discharge fibers, and a second state in which the pressure connector is separated from the one of the plurality of electrostatic discharge fibers, and wherein the electronic processor is coupled to the one of the plurality of electrostatic discharge fibers via the pressure connector when the pressure connector is in the second state.

4. The seating structure of claim 1, further comprising a capacitive electrode supported by the carrier and spaced apart from the plurality of electrostatic discharge fibers.

5. The seating structure of claim 4, wherein the electronic processor is configured to apply the drive signal to the capacitive electrode such that a capacitive field is formed between the capacitive electrode and a subset of the plurality of electrostatic discharge fibers, wherein the sensor is coupled to one selected from a group consisting of the capacitive electrode and the subset of the plurality of electrostatic discharge fibers, and wherein the output signal is indicative of a voltage between the capacitive electrode and the subset of the plurality of electrostatic discharge fibers.

6. The seating structure of claim 5, further comprising:
a second capacitive electrode supported by the carrier and spaced apart from the plurality of electrostatic discharge fibers, wherein the electronic processor is configured to apply the drive signal to the second capacitive electrode such that a second capacitive field is formed between the second capacitive electrode a second subset of the plurality of electrostatic discharge fibers; and
a second sensor coupled to one selected from a group consisting of the second capacitive electrode and the second subset of the plurality of electrostatic discharge fibers, the second sensor configured to generate a second output signal indicative of a second voltage between the second capacitive electrode and the second subset of the plurality of electrostatic discharge fibers,
wherein the first subset of the plurality of electrostatic discharge fibers is oriented orthogonal to the second subset of the plurality of electrostatic discharge fibers.

7. The seating structure of claim 1, wherein the electronic processor is configured to apply the drive signal to a first electrostatic discharge fiber of the plurality of electrostatic discharge fibers, wherein the sensor is coupled to a second electrostatic discharge fiber of the plurality of electrostatic discharge fibers, and wherein the output signal is indicative of a voltage between the first electrostatic discharge fiber and the second electrostatic discharge fiber.

8. The seating structure of claim 1, wherein the electronic processor is configured to
determine whether the output signal exceeds an occupancy threshold,
determine whether the output signal exceeds a proximity threshold, the proximity threshold being lower than the occupancy threshold, and
determine the state of the seating structure based on the whether the output signal exceeds at least one selected from a group consisting of the occupancy threshold and the proximity threshold.

9. The seating structure of claim 1, wherein the drive signal is an applied voltage, and wherein the electronic processor is configured to determine a time of dissipation of the applied voltage, and determine that the seating structure is occupied when the time of dissipation exceeds an occupancy threshold.

10. The seating structure of claim 1, wherein the drive signal is a radio frequency signal, and wherein the electronic processor is configured to measure an amplitude of a response signal received in response to the drive signal, and determine that the seating structure is occupied when the amplitude of the response signal is below an occupancy threshold.

11. A method of sensing occupancy of a seating structure having a suspension material with a plurality of electrostatic discharge fibers, the method comprising:
applying, with an electronic processor supported by the seating structure, a drive signal to at least one of the plurality of electrostatic discharge fibers of the suspension material, the suspension material spanning across a back opening, a seat opening, or both of the seating structure;
generating, with a sensor supported by the seating structure, an output signal indicative of an electrical parameter of one of the plurality of electrostatic discharge fibers;
receiving, with the electronic processor, the output signal from the sensor; and
determining, with the electronic processor, a state of the seating structure based on the output signal from the sensor.

12. The method of claim 11, further comprising coupling the electronic processor to at least one of the plurality of electrostatic discharge fibers via a fastener, wherein the fastener connects the suspension material to a carrier of the seating structure, and wherein the electronic processor applies the drive signal to the at least one of the plurality of electrostatic discharge fibers through the fastener.

13. The method of claim 11, wherein the seating structure includes a pressure connector positioned adjacent one of the plurality of electrostatic discharge fibers, and further comprising:
moving the pressure connector between a first state in which the pressure connector is in contact with the one of the plurality of electrostatic discharge fibers, and a second state in which the pressure connector is separated from the one of the plurality of electrostatic discharge fibers; and
coupling the electronic processor to at least one of the plurality of electrostatic discharge fibers via the pressure connector when the pressure connector is in the first state.

14. The method of claim 11, wherein applying the drive signal includes applying the drive signal to a capacitive electrode coupled to a subset of the plurality of electrostatic discharge fibers, the capacitive electrode spaced apart from the subset of the plurality of electrostatic discharge fibers.

15. The method of claim 14, wherein applying the drive signal to the capacitive electrode includes generating a capacitive field between the capacitive electrode and the subset of the plurality of electrostatic discharge fibers, and wherein generating the output signal includes generating the output signal indicative of a voltage between the capacitive electrode and the subset of the plurality of electrostatic discharge fibers.

16. The method of claim 15, further comprising:
applying, with the electronic processor, a second drive signal to a second capacitive electrode such that a second capacitive field is formed between the second capacitive electrode and a second subset of the plurality of electrostatic discharge fibers, the second subset of the plurality of electrostatic discharge fibers being oriented orthogonal to the second subset of the plurality of electrostatic discharge fibers; and generating, with a second sensor, a second output signal indicative of a second voltage between the second capacitive electrode and the second subset of the plurality of electrostatic discharge fibers.

17. The method of claim 11, wherein applying the drive signal includes applying, with the electronic processor, the drive signal to a first electrostatic discharge fiber of the plurality of electrostatic discharge fibers; and wherein generating the output signal includes generating, with the sensor coupled to a second electrostatic discharge fiber of the plurality of electrostatic discharge fibers, the output signal indicative of a voltage between the first electrostatic discharge fiber and the second electrostatic discharge fiber.

18. The method of claim 11, further comprising:

determining, with the electronic processor, whether the output signal exceeds an occupancy threshold;

determining, with the electronic processor, whether the output signal exceeds a proximity threshold; and wherein determining the state of the seating structure includes determining the state of the seating structure based on whether the output signal exceeds one selected from a group consisting of the occupancy threshold and the proximity threshold.

19. The method of claim 11, wherein applying the drive signal includes applying, with the electronic processor, a voltage signal to one of the plurality of electrostatic discharge fibers, and further comprising:

determining, with the electronic processor, a time of dissipation of the voltage signal, and wherein determining the state of the seating structure includes determining, with the electronic processor, that the seating structure is occupied when the time of dissipation exceeds an occupancy threshold.

20. The method of claim 11, wherein applying the drive signal includes applying, with the electronic processor, a radio frequency signal to one of the plurality of electrostatic discharge fibers, and further comprising:

determining, with the electronic processor, an amplitude of a response signal received by the electronic processor in response to the drive signal, and wherein determining the state of the seating structure includes determining, with the electronic processor, that the seating structure is occupied when the amplitude of the response signal is below an occupancy threshold.

* * * * *